US005517817A

United States Patent [19]

Hines

[11] Patent Number: 5,517,817

[45] Date of Patent: May 21, 1996

[54] VARIABLE AREA TURBINE NOZZLE FOR TURBINE ENGINES

[75] Inventor: William R. Hines, Cincinnati, Ohio

[73] Assignee: General Electric Company, Cincinnati, Ohio

[21] Appl. No.: 142,019

[22] Filed: Oct. 28, 1993

[51] Int. Cl.$^{6}$ .................................. F02C 7/12; F01D 5/18

[52] U.S. Cl. .......................... 60/39.75; 415/115; 415/160

[58] Field of Search ........................... 60/39.75; 415/115, 415/149.4, 160, 180

[56] References Cited

U.S. PATENT DOCUMENTS

| | | | |
|---|---|---|---|
| 2,819,732 | 1/1958 | Paetz | 138/46 |
| 2,972,441 | 2/1961 | Hall | 415/149.4 |
| 3,625,003 | 12/1971 | Liddle et al. | 60/39.25 |
| 3,674,377 | 7/1972 | Trappmann | 415/160 |
| 3,678,691 | 7/1972 | Shohet et al. | 60/239 |
| 3,981,140 | 9/1976 | Lunsford et al. | 60/39.03 |
| 4,135,362 | 1/1979 | Glenn | 60/39.16 |
| 4,145,875 | 3/1979 | Liddle et al. | 60/39.03 |
| 4,387,563 | 6/1983 | Bell, III | 60/39.25 |
| 4,490,622 | 12/1984 | Osborn | 290/52 |
| 4,695,220 | 9/1987 | Dawson | 415/160 |
| 4,821,506 | 4/1989 | Rodgers | 60/39.2 |

FOREIGN PATENT DOCUMENTS

| | | | |
|---|---|---|---|
| 609682 | 10/1948 | United Kingdom | 415/160 |

*Primary Examiner*—Richard A. Bertsch
*Assistant Examiner*—William Wicker
*Attorney, Agent, or Firm*—Andrew C. Hess; Wayne O. Traynham

[57] ABSTRACT

The present invention is a variable area turbine nozzle for use in a turbine engine. The variable area turbine nozzle adjusts the positions of its vanes to insure efficient operation of the turbine engine. The vanes rotate about bearing assemblies that are air cooled to extend the operating life of the bearing assemblies. Each vane is cantilevered off journal bearings outside the outer casing which carry moment loads while ball bearings take all radial loads for ease of rotation. This design provides long running time of the turbine nozzles without frequent overhaul.

24 Claims, 13 Drawing Sheets

18
22
26
27
10
53
22
12
4
4
77
77
16
60
20
64
60
78
80
73

VARIABLE AREA TURBINE NOZZLE FOR TURBINE ENGINES

BACKGROUND OF THE INVENTION

1. Field of the Invention

This invention relates to a variable area turbine nozzle and, more particularly, to a variable area turbine nozzle for use in a multistage turbine engine.

2. Description of the Related Art

In the design of gas turbine engines, the flow through the engine is varied by a plurality of stator vanes and rotor blades. Typically, these vanes and rotors are fixed at particular positions and angles in order to accomplish the appropriate flow function through the various stages of the turbine engine. There have been attempts to vary the flow path through the turbine engine by varying the angle of the vanes to improve the efficiency and operation of the turbine engine.

U.S. Pat. No. 4,135,362 issued to Glenn discloses a split-shaft gas turbine engine having a variable vane and support assembly to provide a flow path between the last stage of a gas generator and the first stage of a low-pressure turbine. The '362 patent discloses the use of a variable vane having a hollow passage to allow a support strut to pass therethrough for supporting the vane and the inner strut. The strut is also hollow which provides a passage for cooling air to the inner strut of the turbine in the vicinity of the variable vane. The rotation of the vane is through sleeve bearings. The '362 design is complex and does not address prolonged field operation.

U.S. Pat. No. 2,819,732 issued to Rapaetz discloses a variable area turbine entrance nozzle having moveable vanes which are rotated in the middle stage of a turbine engine. The moveable vanes are sealed against the outer casing and rotor to prevent any leakage of air therethrough. Again the '732 design is not for prolonged field operation.

What is needed is a design which can vary the vane angles of a stage of a turbine engine which provides long life in the field before overhaul. Such long life should provide up to 25,000 hours of running time between repair intervals.

SUMMARY OF THE INVENTION

Accordingly, it is an object of the invention to provide a variable area turbine nozzle which can be used in a turbine engine, more particularly for marine and industrial applications, wherein long life and low leakage are desired.

Another object of the present invention is to provide a variable area turbine nozzle which increases the efficiency of the gas turbine engine during low power operation near idle.

It is yet another object of the present invention to provide cooled bearing assemblies for the vane segments such that the vane segments will provide long life and the necessary vane angle adjustment for efficient operation of the turbine engine.

In accordance with the invention, a variable area turbine nozzle is provided for varying the flow path through a turbine engine, such as a dual rotor drive engine or free wheel power turbine. The turbine engine has a rotor with a rotor platform diameter and an outer stator casing which defines the flow path. The variable area turbine nozzle comprises stator rotatable vane segments having outer and inner trunnions. An inner diameter ring supports the inner trunnion of the vane segment. Bearing assemblies are coupled to the outer and inner trunnions and to the outer casing and inner diameter ring. These bearing assemblies define purging passages for the leakage of air to cool the bearing assemblies for extending the operating life of the assemblies. The bearing assemblies also bear the moment and axial loads for long life and easy actuation that requires low power. A means for purging the air through the bearing assemblies is provided for cooling the assemblies.

In this design the inner diameter ring forms a plurality of toroid segments. These toroid segments define cooling chambers for cooling the bearing assemblies attached to the inner diameter ring and the inner trunnions. Outer cooling chambers are provided around the outer bearing assemblies attached to the outer trunnions and outer casing for cooling the outer bearing assemblies.

Further, in this design a cooling passage can be provided through the vane segment to allow purging air to pass from the outer cooling chamber, to the inner cooling chamber, for cooling the inner bearing assembly.

Yet further, the design of the present invention allows disassembly of the bearing assembly outside of the case for easy maintenance.

The present invention could be applied to any engine turbine requiring variable area turbine vanes which are adjusted from the outer diameter of the outer casing. In general, the present invention is applicable to any turbine engine requiring long life and easy maintenance.

These advantages, and others, may be more readily understood in connection with the following specification, appended claims and the drawings.

DETAILED DESCRIPTION OF THE INVENTION

Figure 1:
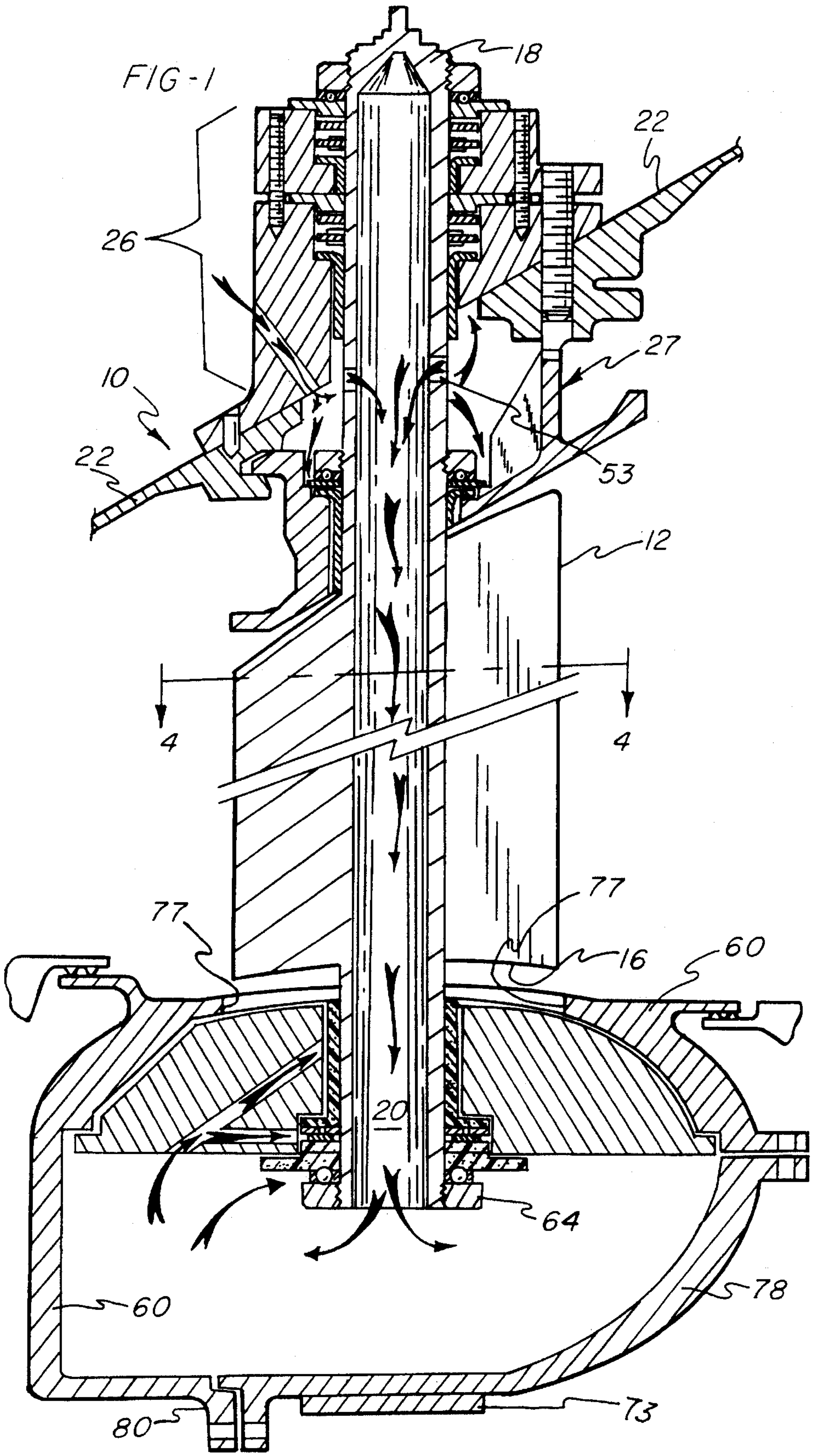
FIG. 1 is a cross-sectional view of a vane segment of the variable area turbine nozzle of the present invention.

Referring to the drawings, the variable area turbine nozzle 10 has a plurality of vane segments 12. It should be understood that for illustrative purposes, only one vane segment will be described and that the variable area turbine nozzle of the present invention comprises several vane segments forming a nozzle stage of a turbine. Each vane segment has an outer end 14 and an inner end 16. Attached to the outer end 14 of the vane segment 12 is an outer trunnion 18. Attached to the inner end 16 of the vane segment 12 is an inner trunnion 20.

The variable area turbine nozzle 10 has a plurality of vanes. Each nozzle stage has a plurality of vanes 12 which form an annular ring of vane segments for varying the flow path or flow function through a stage of a turbine engine. This change in flow function is desired of unchoked or multistage turbines. It is necessary to vary the vane angles of a midstage within the turbine to achieve maximum efficiency of the turbine engine. It should be understood, that the variable area turbine nozzle can have a single stage of vanes which can be varied or a plurality of stages of vanes which can be varied. Typically, it may take 3.5% change in physical area to realize a 1% change in actual flow function.

The determining factor as to how many stages of vanes should be varied depends upon the particular flow function which is desired in the turbine engine. For example, if the variable area turbine nozzle is located in the first stage of the turbine engine and if the vanes of the first stage are varied, then the range of flow function variation could be −24% to +8%. If the second stage vanes of the turbine engine are varied, then the range of flow function variation could be −17% to 5%. If the first and second vane stages are varied, then the range of flow function variation could be from −25% to +15%.

The desired variation depends upon the operation of the turbine engine. For example, in the case of a power turbine requiring control area variation or flow function variability having very hot entrance temperatures, it is desired that the second stage vanes be varied alone. Therefore, instead of mechanizing stage 1 vanes which are very hot in operating temperature, a cooler stage 2 vanes may be varied alone.

Generally, the vane segments are rotated up to about 25° from the norm to vary the flow area up to 30%. It should also be noted that compressor variable vanes of a turbine engine are moving continuously during the life of a turbine engine, even during steady state running. The variable vane of a variable turbine nozzle would move only as a function of power setting, for example, the vanes would be closed at lower power where over 50% of the fuel is consumed.

Figure 2:
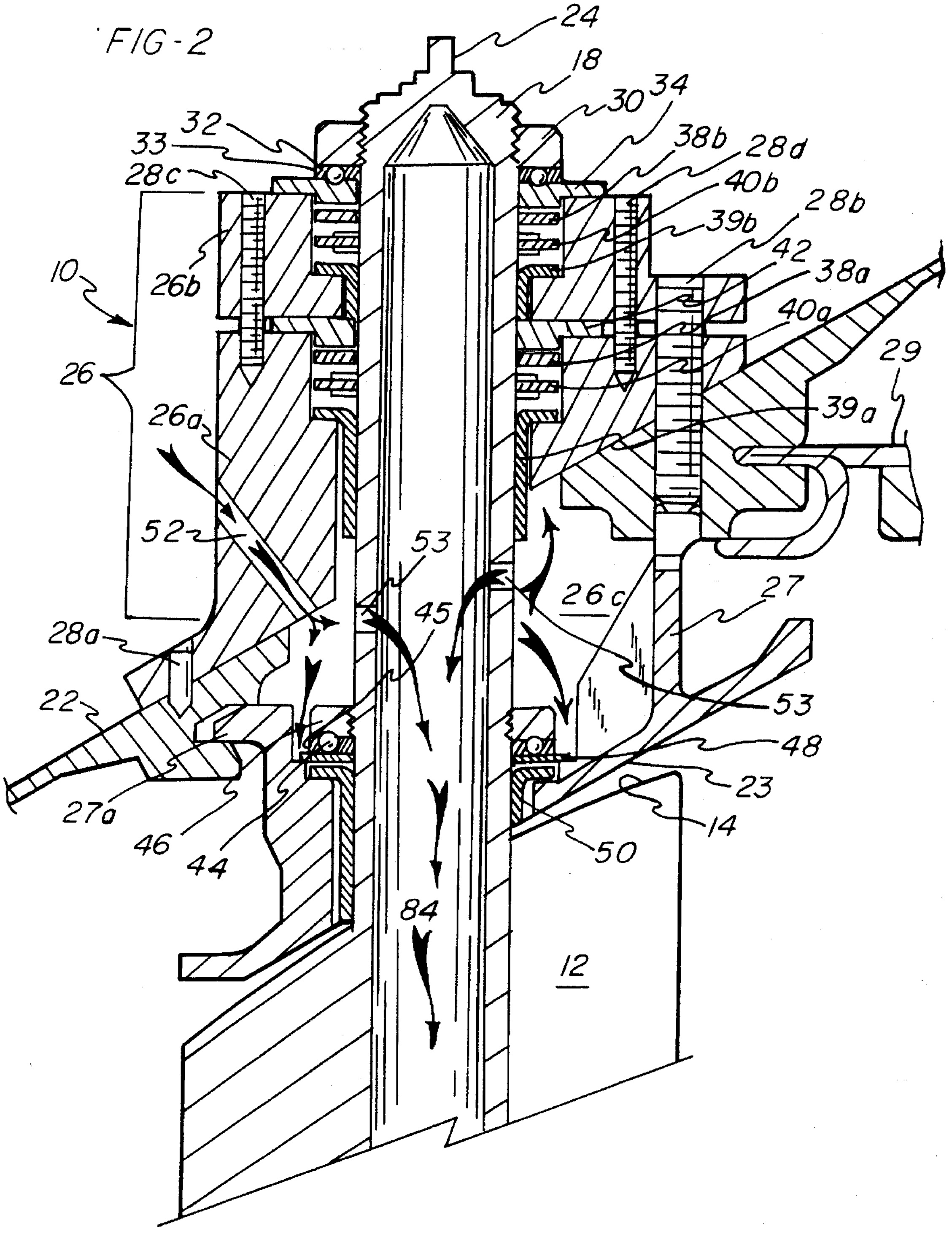
FIG. 2 is a cross-sectional view of the outer bearing assembly.

Referring to FIG. 2, the outer casing 22, of the turbine engine, has a plurality of apertures for each outer trunnion 18 of the vane segments 12. The outer trunnion 18 extends through the aperture for rotational attachment. The hanger or shroud 27 is attached to the outer casing for holding the bearing assembly and vane segment. It should be noted that the variable area turbine nozzle 10 is designed to retrofit into an existing turbine engine such as the CF6-80C2 or LM 6000 produced by General Electric Company.

The outer trunnion 18 has an actuator lever stud 24 for attachment of an actuator lever to rotate the vane segment 12. A cooling chamber 26 is attached to the outer casing 22 for mounting the outer trunnion and containing purging cooling air for cooling the various bearings attached to the outer trunnion 18. The cooling chamber 26 is attached to the outer casing via screws 28.

The cooling chamber has a first **26*a* and second 26*b*** adaptors or housings. These adaptors are used to retrofit the present invention onto the outer casing of a CF6-80C2 turbine engine.

The first adaptor **26*a*, on the outer casing is held by a forward bolt 28*a* and a rear bolt 28*b* or by some other type of fastening devices. The second adaptor 26*b* is attached to the first adaptor 26*a* by bolts 28*c* and 28*d*. A shroud 27, or hanger, is held in the front by hook 27*a* and at the rear, by C-clip 29**, of the rotor shroud support.

The outer casing aperture is large enough to allow access for assembling the bearing assembly. At the shroud aperture, a flange bushing 50 is positioned by a seating spacer 48 which is seated by a bearing 44 held by a nut 46 on the outer trunnion 18. The seating spacer 48 acts as a race for the roller bearings 44. The bearing 44, such as a ball bearing, and seating spacer 45 are made of thin, dense, chrome coated tungsten 15 for operation at 1000° F. The bearing 44 may have a thin dry film lube if made of BG42 or GE440C for operation at 600° F. The flanged bushing 50 is made of glass fiber polyimide, and sized so as not to incur bearing loads due to moments on the vane segment 12. External to the outer casing 22, are a bearing and bushing assembly. The bushing assembly of the first adaptor **26*a* has a flanged bushing 39*a*, a journal bearing 40*a* and a washer 38*a*. The bushing 39*a* and washer 38*a* are made of a glass fiber polyimide material. The journal bearing is made of thin, dense, chrome coated tungsten 15**, or BG42 or GE440C with dry film lube.

A spacer 42 is to insure that when second adaptor **26*b* is tightened onto the first adaptor 26*a*, no load is applied to the bushing assembly of the first adaptor 26*a***.

The bearing assembly of the second adaptor **26*b* has flange bushing 39*b*, a journal bearing 40*b*, a washer 38*b* and a bearing spacer 34. Again, the journal bearing 40*b*, bushing 39*b*, and washer 38*b* are made of the same materials as stated above. The difference in the second adaptor 26*b* is that a bearing 32, such as a ball bearing, is held in position by nut 30 and spacer 34. Seating spacer 34 acts as a race for ball bearing 32. The bearing 32 is made of thin dense chrome coated tungsten 15 and has a seating spacer 33 to ensure proper spacing of the bearing 32. The use of the various bushings, washers and bearings ensures smooth and easy rotation or actuation of the outer trunnion 18** and stable holding of the vane segment in the turbine engine.

The outer end 14 of the vane segment 12 is spherical shaped in order to provide non-interfering rotation about the outer casing. The tip 23 of shroud 27, adjacent to the outer end 14 of the vane segment, is also spherically shaped for such non-interfering rotation.

Various passages 52 are provided for allowing cooling or purging air through the outer cooling chamber to cool the bearings and the bushings. These cooling chambers 52 allow the purging air to enter the cooling chamber **26*c*** and passes around and through the bearings and other bushings as shown by the arrows. The bearings and bushings have leak passages therethrough for the passage of the purging air. This purging air prevents the hot mainstream gases, from the engine, from entering into the cooling chamber. The purging air is at a pressure which exceeds the pressure of the hot mainstream gases of the engine and can be produced by a compressor and is most preferably from the forward stages of a high pressure compressor of the turbine engine. The overboard leakage passages are much more restrictive than the leakage path into the main gas stream. For example, the seating spacers seal tightly and allows leakage into main flow path of the turbine with small amounts of leakage overboard.

Figure 3:
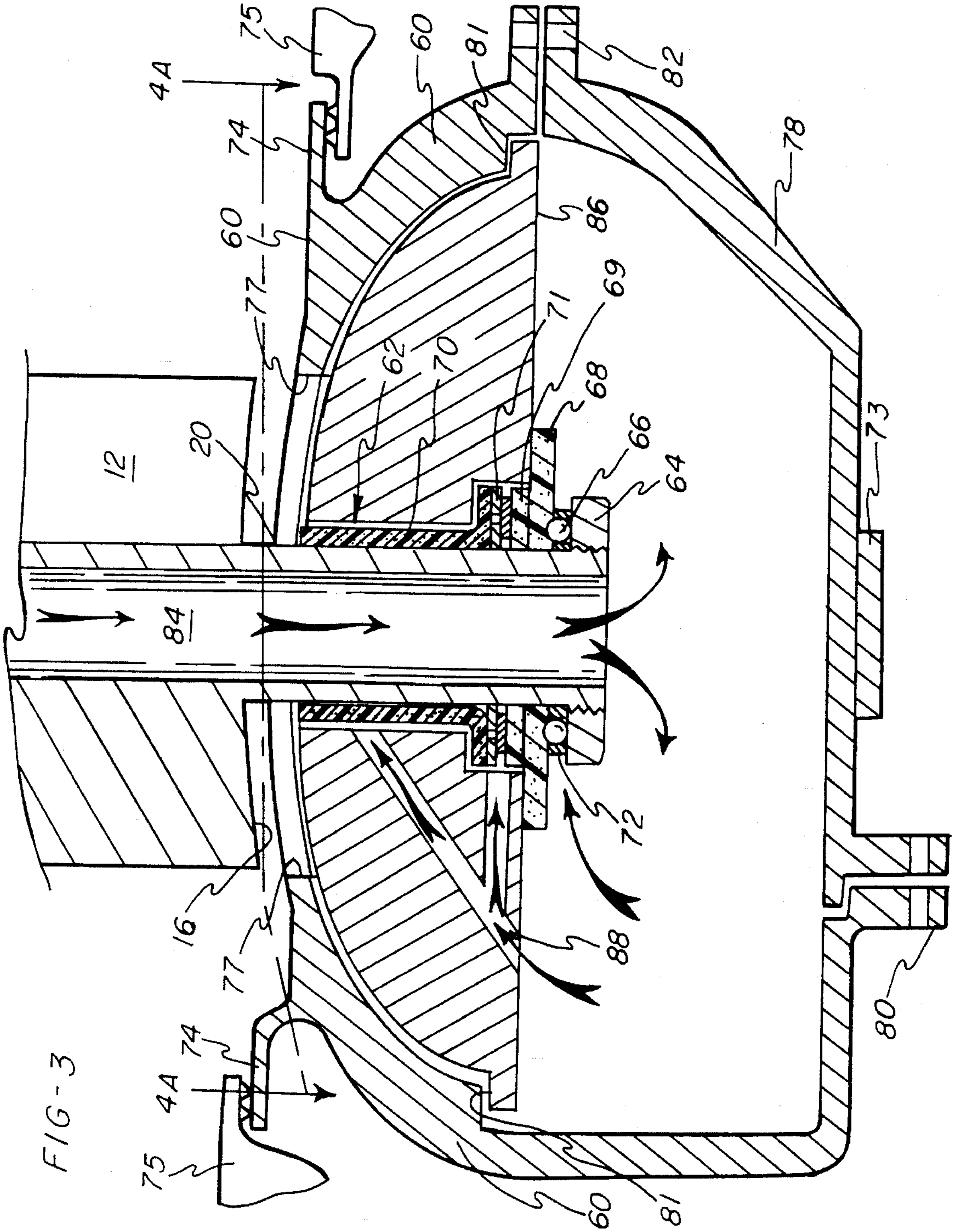
FIG. 3 is a cross-sectional view of the inner bearing assembly of the present invention.

Referring to FIG. 3, the vane segment 12 has the inner trunnion 20 positioned through an aperture in an inner diameter ring 60. The inner diameter ring is positioned adjacent the junction of the rotor blade and the rotor, referred to as the rotor diameter. It should be understood that the inner diameter ring 60 is a circumferential ring which is unsupported other than by the vane segments 12 and trunnions 20 themselves. This is due to the rotation of the rotors 75 and rotor blades between the stator vane segments 12.

This inner diameter ring 60 is shown in cross-section such that it is adjacent the rotors 75 of the turbine engine. The inner trunnion.20 is held inside the inner diameter ring 60 by nut 64. Adjacent the nut 64 is roller bearing 66, seating spacer 68 and washer 69. The seating spacer 68 pre-sets the clearances for bushings and washers so that they are not tightly clamped. This reduces wear. Again, the journal bearing 71 is made of thin dense chrome coated tungsten 15 and the flange bushing 70 and washer 69 are made of glass fiber polyimide. A seating spacer 72 is utilized to maintain the roller bearings in rolling relationship between the nut 64 and seating spacer 68. Seating spacer 68 acts as a race for roller bearing 66. The journal bearing 71 is the primary moment load carrying contact with the inner diameter ring and insert 86. Insert 86 is sized to fit in the upper half of the inner diameter ring 60, in alignment with the trunnion apertures in the inner diameter ring 60. Flanged bushing 70 carries no load but allows cooling air leakage to pass it and purge away hot gases back into the mainstream.

Figure 4A:
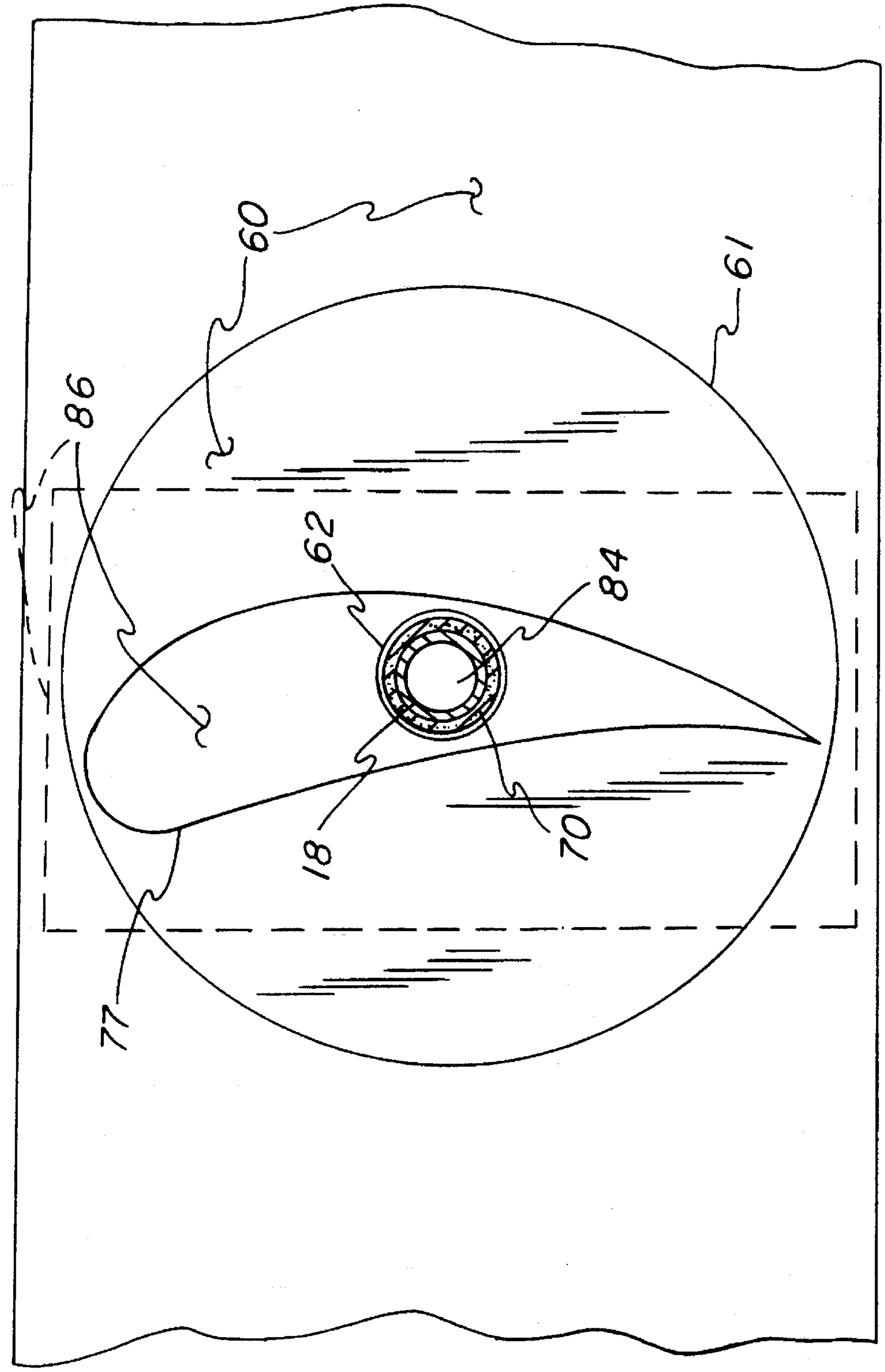
FIG. 4A is an elevational view of the vane segment cutout in part 60 of FIG. 3 for the vane assembly.

Referring to FIGS. 3 and 4A, purging air may pass through cooling air passage 53 (FIG. 1 and 2), and 84 in the vane segment and outer and inner trunnions 18 and 20. This purging air enters into the purging air passage 84 from holes 53 in the outer trunnion, into the passage 84, through the outer trunnion 18 through the vane segment 12 and inner trunnion 20. This purging air then escapes through the leak paths about bearings 66, 71, washer 69 and bushing 70. Cooling passages 88 are provided in the insert 86 for allowing the purging cooling air to surround the flange bushings 70, washer 69 and journal bearing 71 for preventing the hot mainstream gases from entering the bushing and bearing assemblies. All cooling purge air leaks back into the main gas stream to then do useful work. This provides a great advantage over the prior devices in that the bushing and bearings are protected from the hot mainstream gases and cooled such that long life can be obtained. All contacts caused by moment loads or radial loads are made with either journal bearings or roller bearings to give long life to the bushings and washer. Also, seating spacers prevent leakage. This is essential when a turbine engine is used in an environment such that long running time is needed from an engine in the area of 25,000 hours or more.

Further, cutouts 77 in the inner diameter ring 60 are slightly greater in size than the vanes 12, for inserting the entire vane segment from inside the inner diameter ring 60. Also, vertical flange 80 of cover plate 78 is positioned for vertical insertion of the vane 12 through inner diameter ring 60. The insert 86 or cover plate's seating surface 81 will cover cutout 77 once the inner diameter ring 60 assembly is complete. The vane 12 inner end 16 is spherical shaped to provide non-interfering rotation about inner ring 60.

Figure 4B:
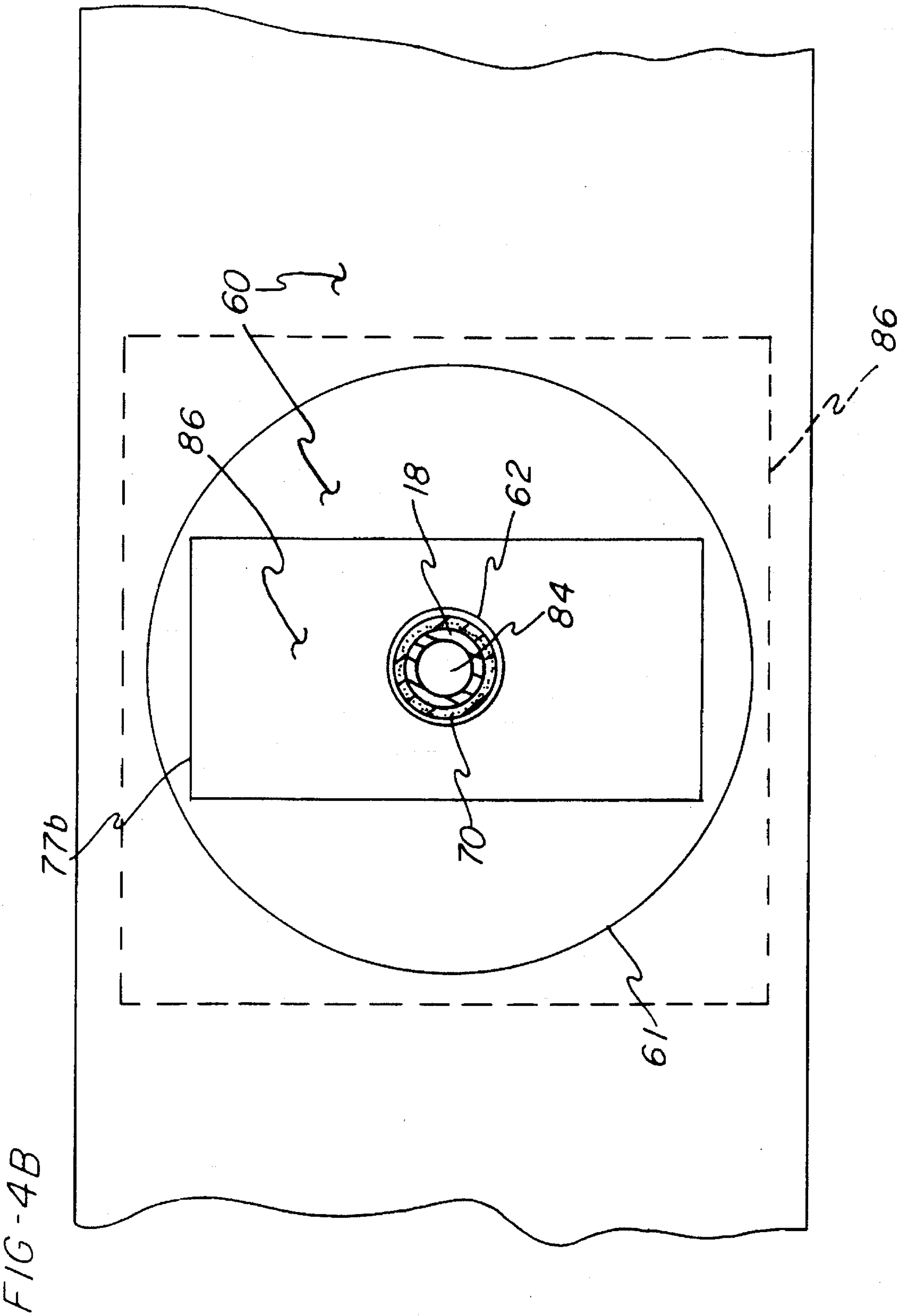
FIG. 4B is an elevational view of an alternative embodiment for the vane segment cutout in part 60 of FIG. 3.

FIG. 4B is an alternative cutout 77*b* in the inner diameter ring 60. Cutout 77*b* is rectangular and has dimensions for allowing the vanes to enter therethrough.

Figure 5A:
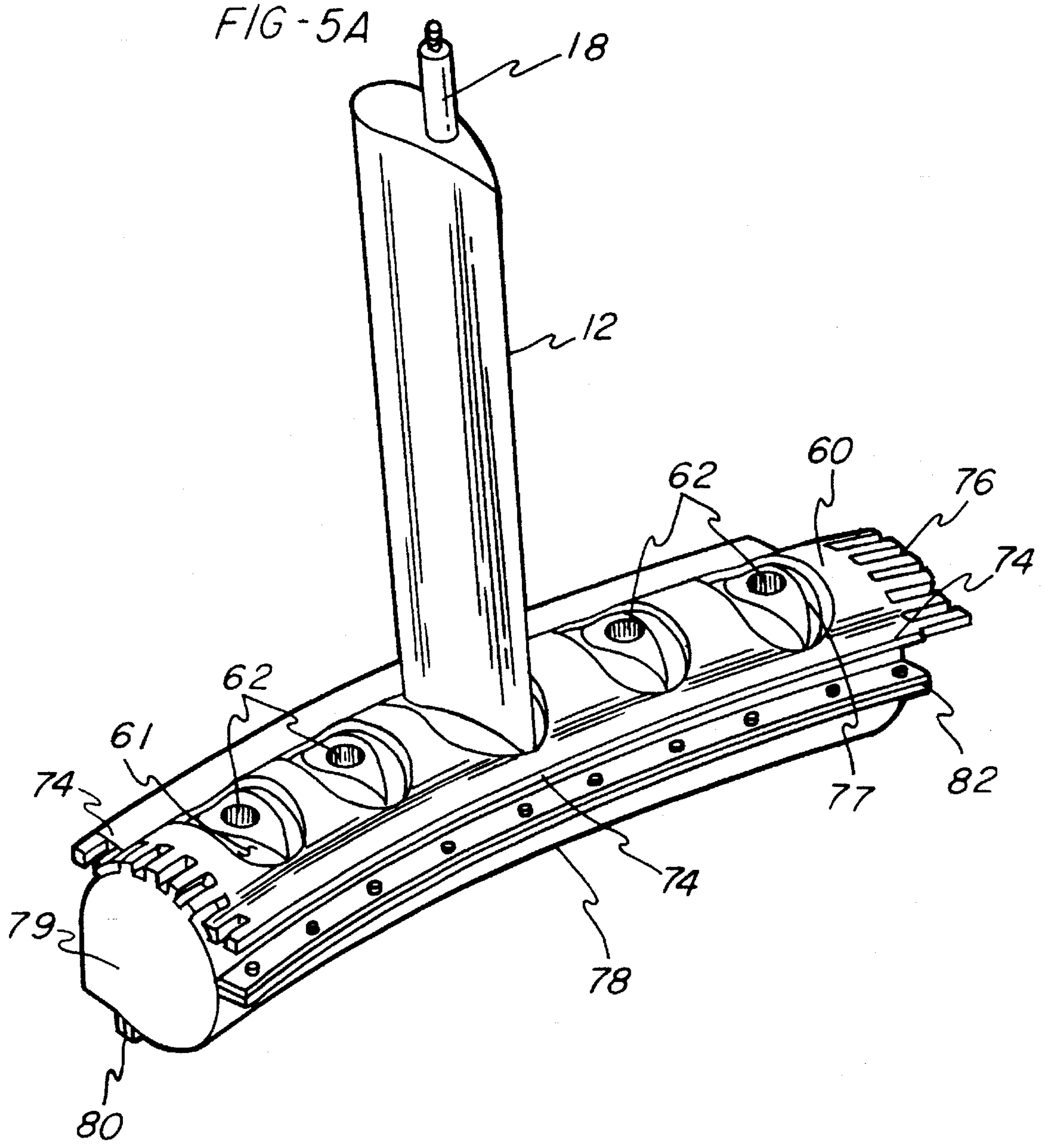
FIG. 5A is a perspective view of the inner diameter ring.

Referring to FIGS. 3 and 5A the inner diameter ring 60 has flow path stationary seals 74 for rotating teeth 75 of the rotors. Spherical cutouts 61 are provided in the inner diameter ring 60 to allow vane 12 rotation. The inner diameter ring 60 can be divided into a plurality of segments which form a toroid. These segments are attached together by spline end seals 76 with the adjacent segment having slots for accepting the spline seal therein. Each segment of the toroid has circumferential splined seals 76 on one end which fit into another segment end having slots for accepting those splined seals.

Figure 5B:
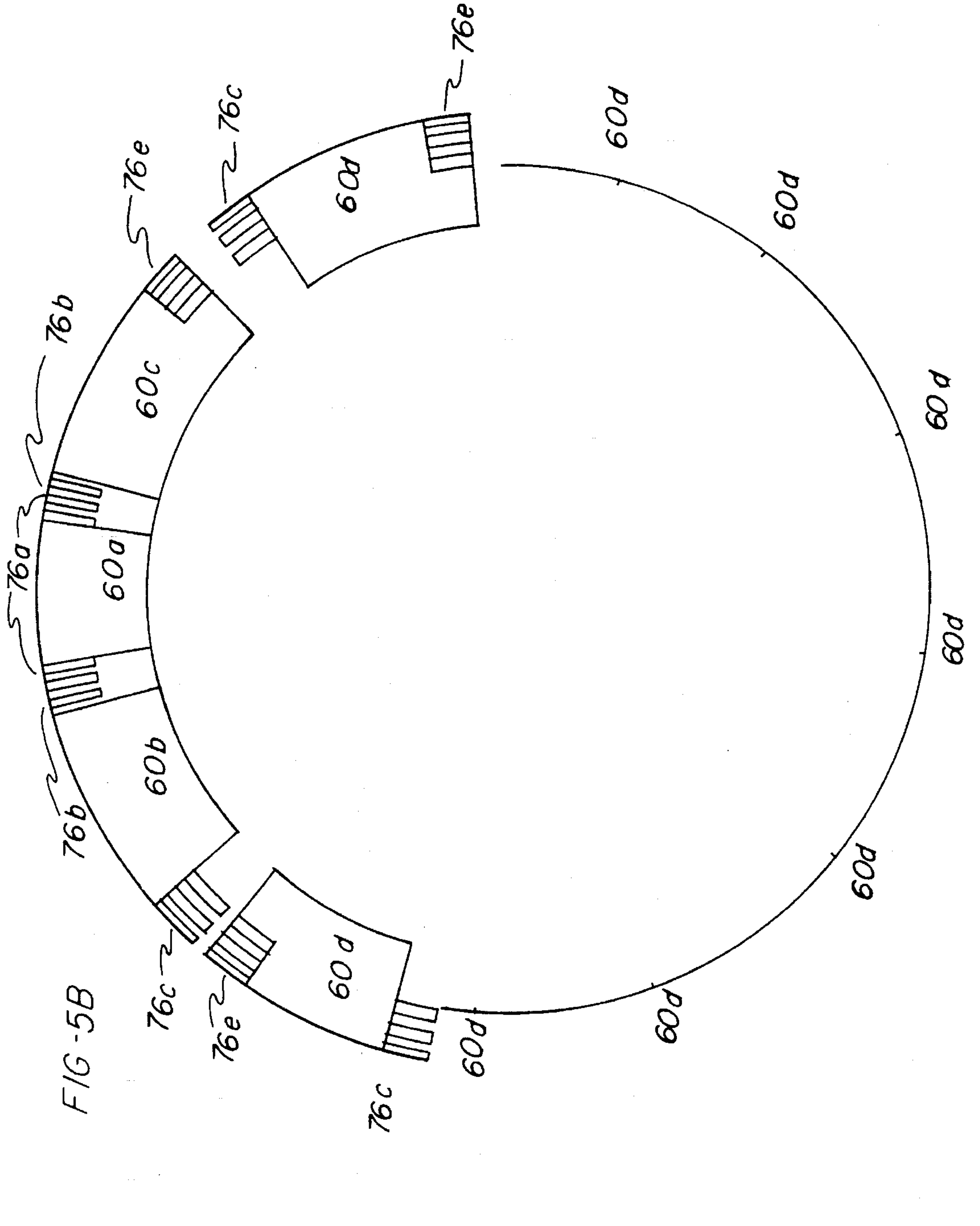
FIG. 5B is an elevational view of the segments forming a ring.
Figure 5C:
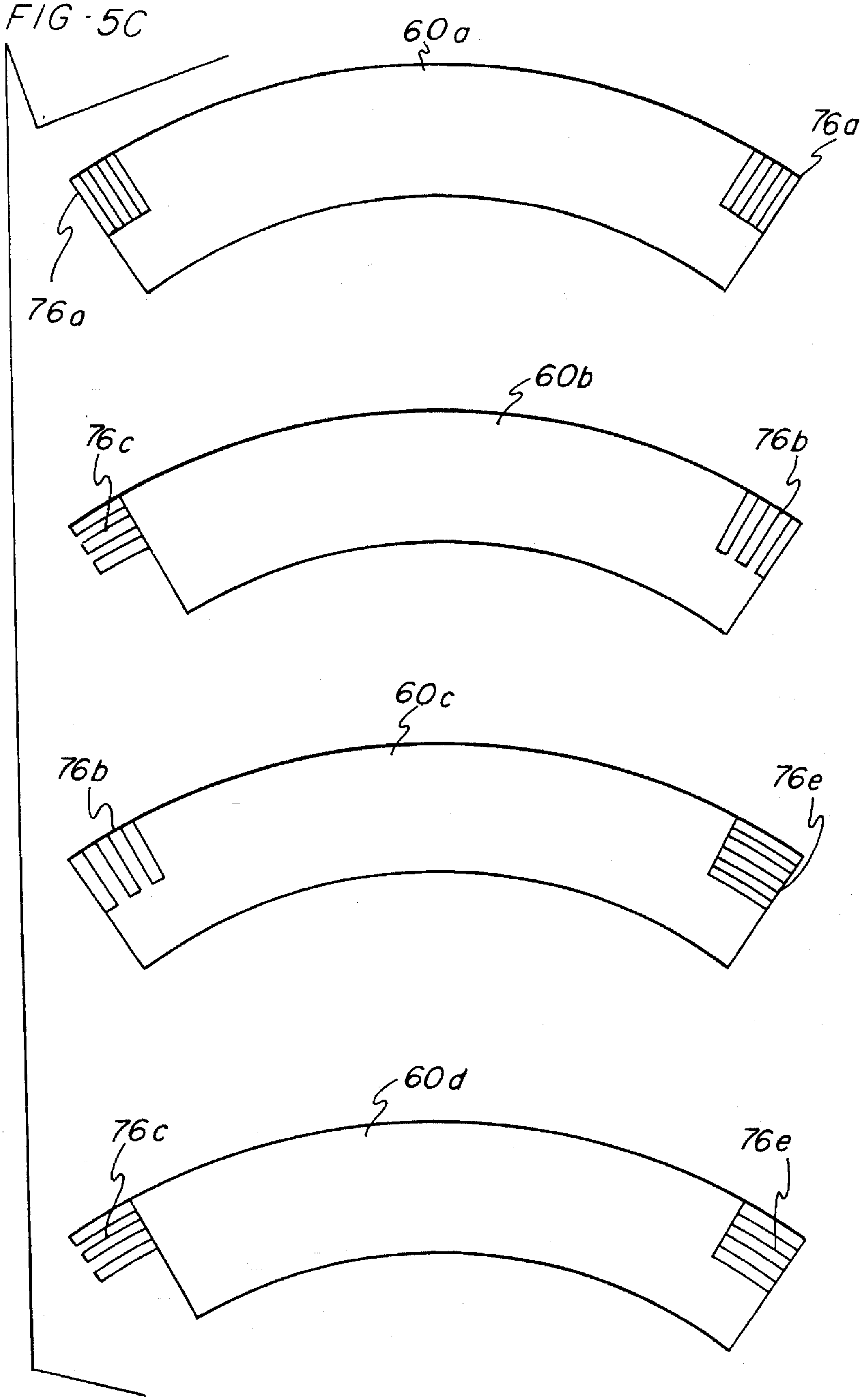
FIG. 5C is an elevational view of the segments used in the inner diameter ring.
Figure 5D:
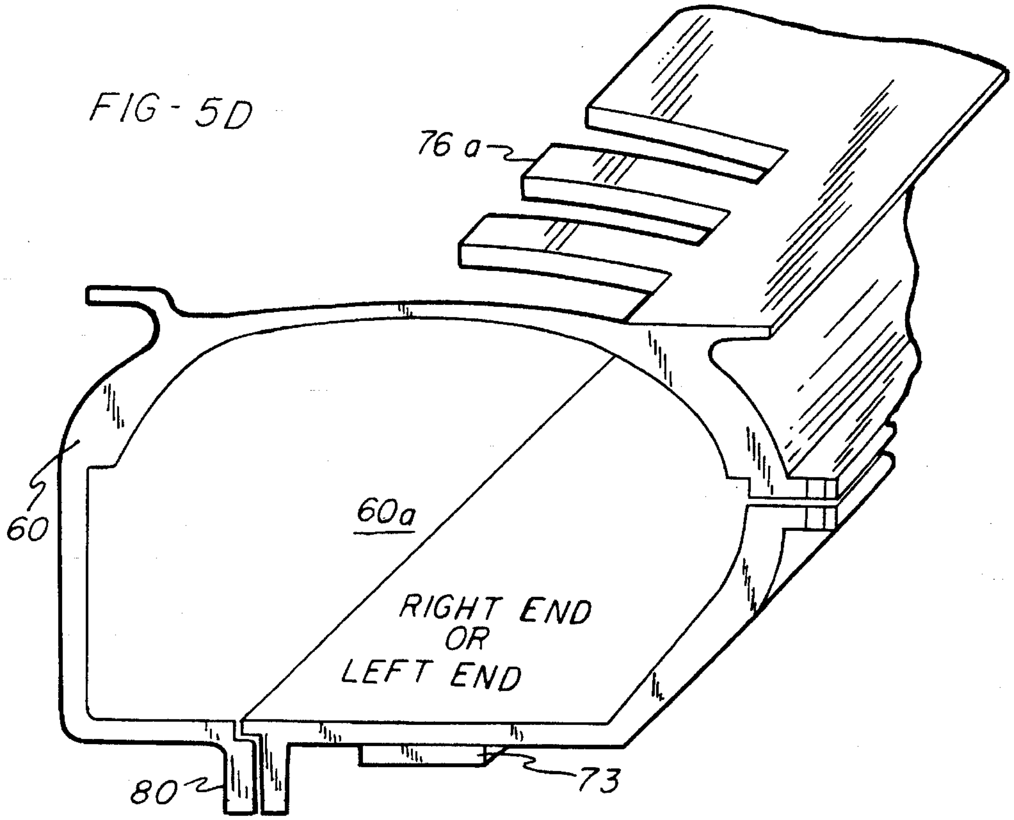
FIGS. 5D–G are end views of each segment used in the inner diameter ring.
Figure 5E:
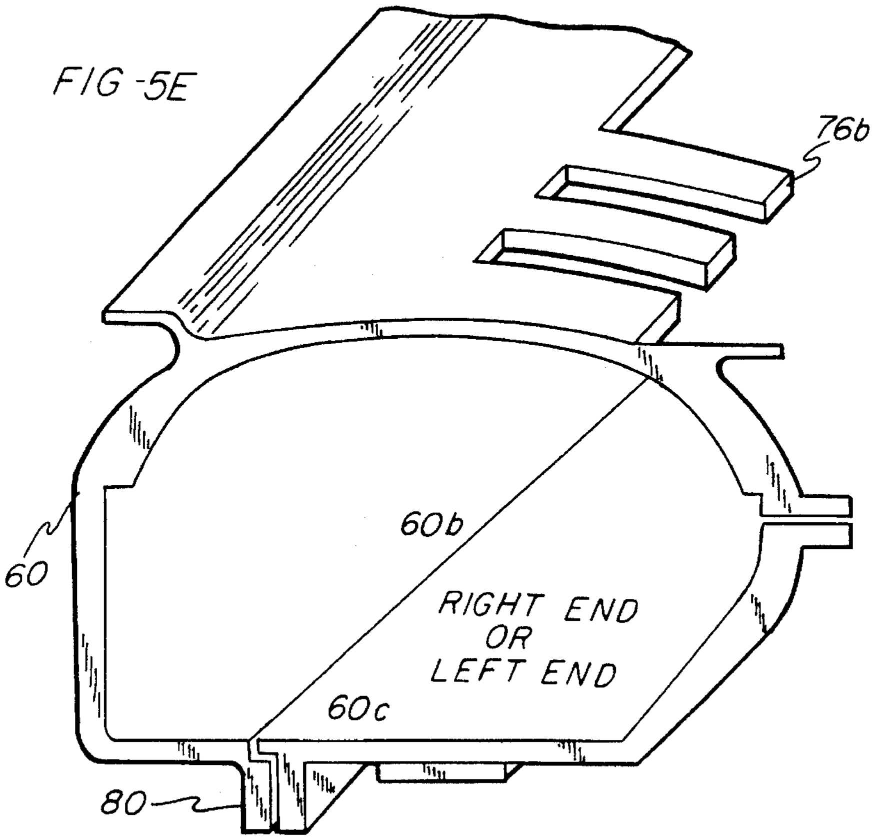
Figure 5F:
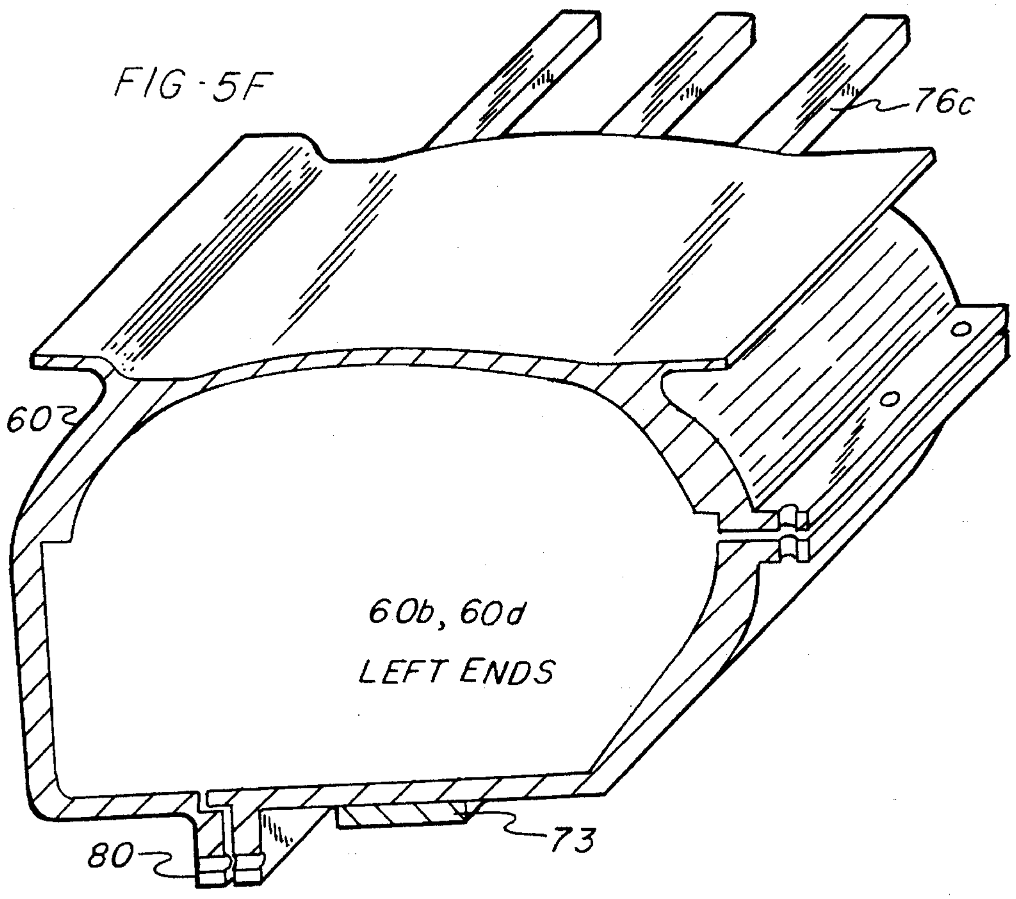
Figure 5G:
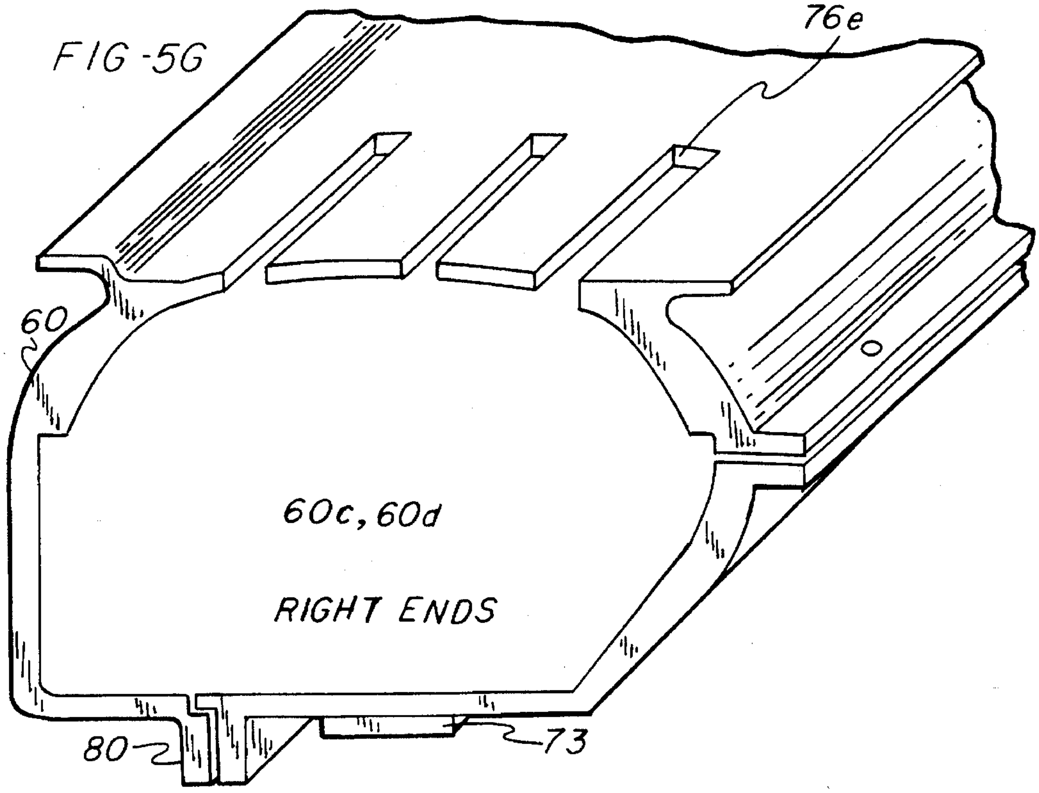

The last segment of the toroid to be installed, i.e., 60*a*, has axial spline seals that fit up with its mating toroid segments shown in FIGS. 5B and 5C. These spline seals extend axially along the surface around each toroid segment from stationary seal 74 along the top on one side to stationary seal 74 on the other side. In segment 60*a* both ends have axial splines 76*a*. In segment 60*b* one end is an axial spline 76*b*, and the other end is a circumferential spline 76*c*. In segment 60*c* one end is a circumferential spline 76*e*, and the other end is an axial spline 76*b*. In segment 60*d* both ends are circumferential splines 76*c* and 76*e*. The segments 60*a*, 60*b* and 60*c* are configured such that segment 60*a* can be the last segment installed and it is slid in axially. All the other segments have circumferential splines 76*c* and 76*e*, the same as segment 60*d*. These splined seals 76 stabilize the entire toroid ring and provide a flowpath for hot gases axially over the toroid.

At final assembly of the inner toroid ring, cover plates 78 are moved circumferentially between two segments and then bolted to parts 60 so as to form a solid 360° toroid along flanges 82 and 80.

Thus, each segment 78 overlaps the next segment 60 to form a solid ring. Cover plates 78 are the last pieces attached to the inner segmented toroid. Each segment is sealed by end caps 79 to form a pressure segment. Sealed end plates 79 of the toroid are welded to inner diameter ring 60 and sealed against cover plate 78 at its contact surface to plates 79. Each inner diameter ring 60 segment is a circumferential segmented ring with a cover plate 78. The cover plate is attached to the segment and ring by bolts and nuts on the vertical flange 80, horizontal flange 82 and sealed by stationary seals. It should be understood that the cover plate 78 may be removed to allow the engine to purge air from the rotor at 886° F., to cool the bearing assembly and thus would not require passage 84 through vane segment 12. By using the cover plate 78, compressed air from a 7th stage of the compressor of the turbine engine at 586° F. can cool the bearing assembly. It is preferred to use cover plate 78 since the bearings will operate at a cooler temperature, thus prolonging the life of the bearings. The cover plate 78 also provides access to the bearing assembly.

Figure 6:
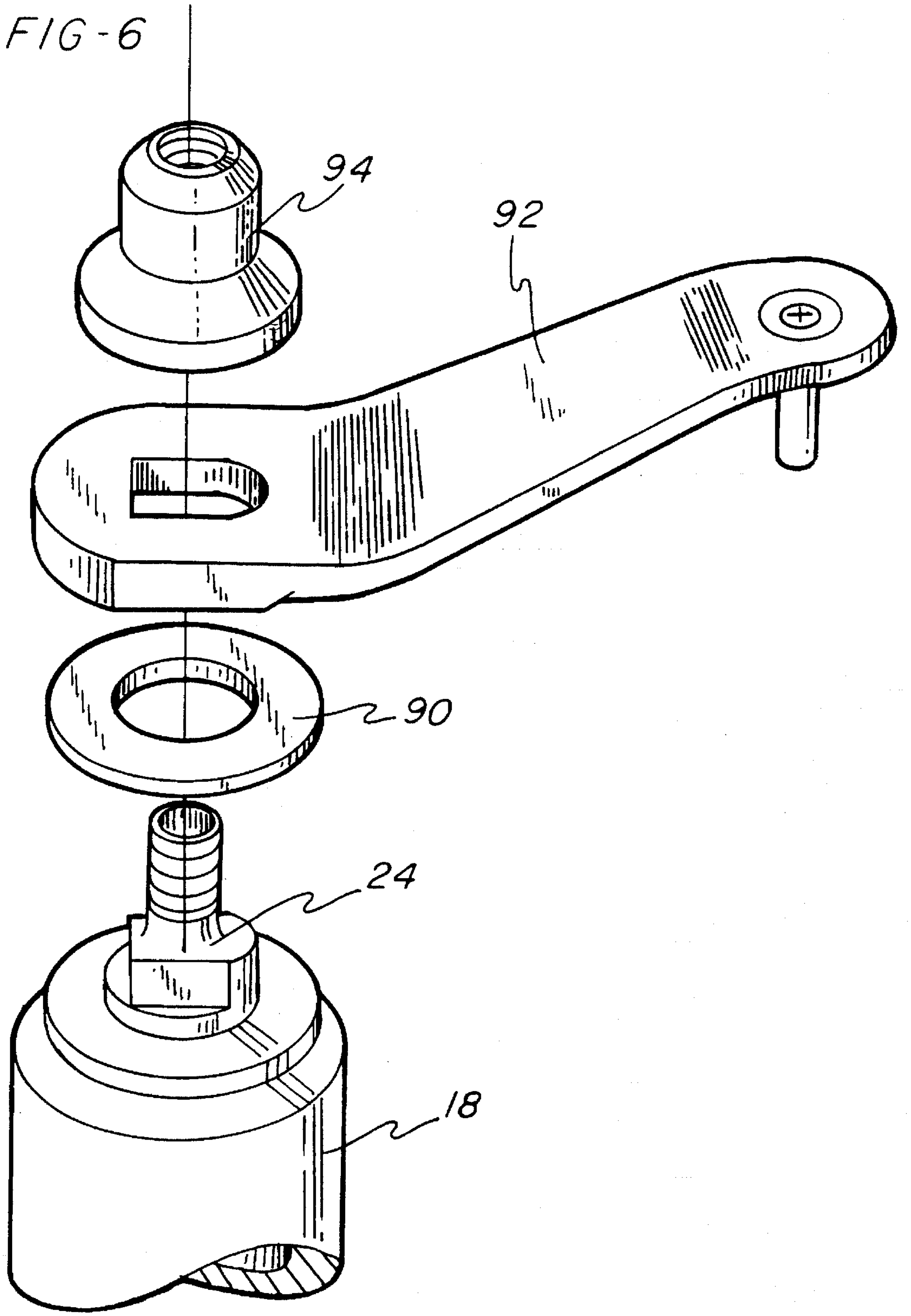
FIG. 6 is an exploded view of the armature assembly attached to the outer trunnion.

Referring to FIG. 6, there is shown the actuator lever stud 24 for rotating the vane segment 12. A washer 90 is positioned on top of the outer trunnion 18 with the lever arm 92 positioned on the actuator lever stud. The lever arm 92 has a D-slot for maintaining the actuator lever arm 92 in a stationary position on the stud 24. A nut 94 maintains the actuator lever arm 92 on top of the stud 24. There is one actuator lever arm for each vane segment which is attached to the adjacent lever arm for rotating each vane segment of the variable area turbine nozzle synchronously.

Figure 7:
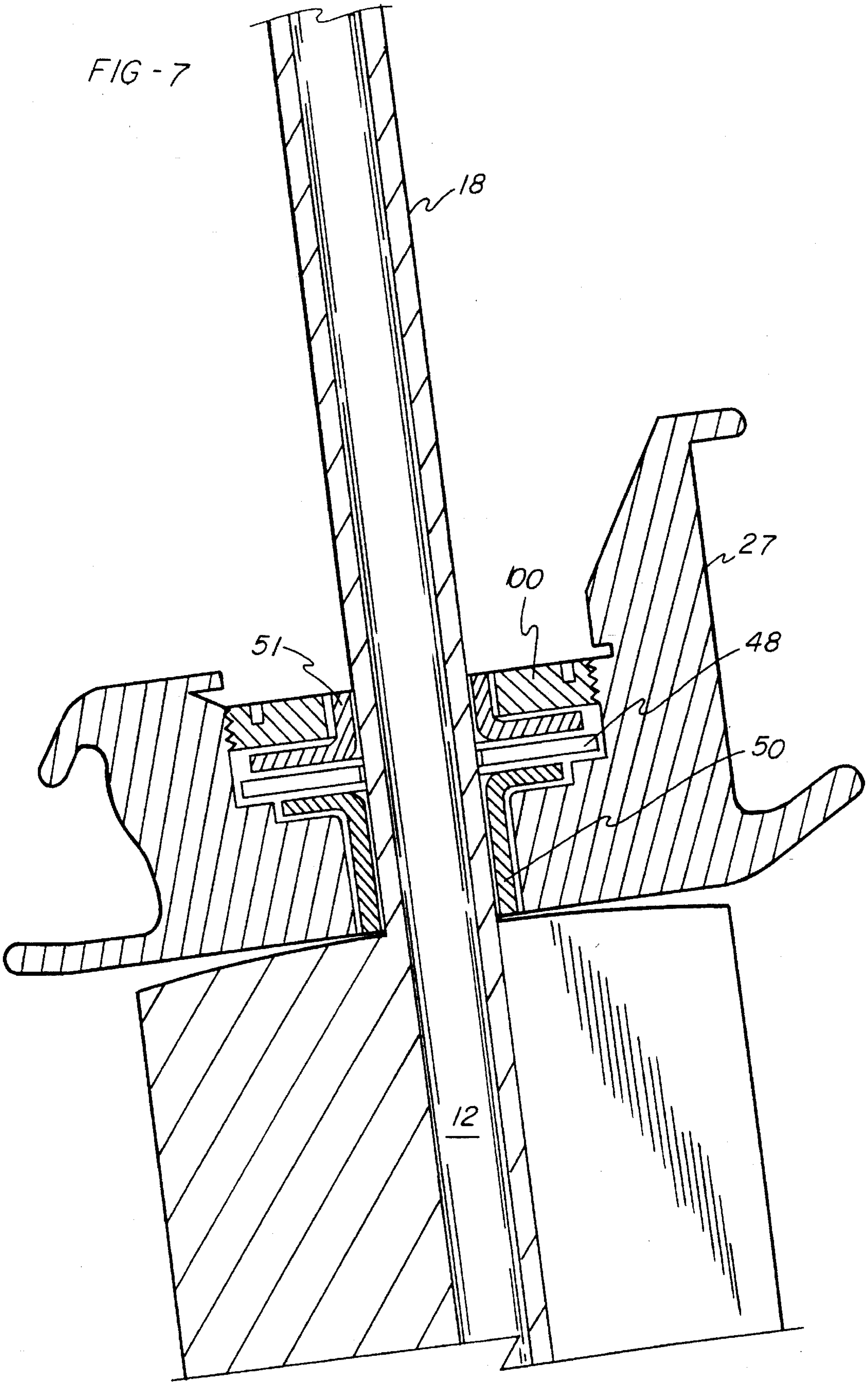
FIG. 7 is an alternative design for the outer bearing assembly.

Referring to FIG. 7, there is shown an alternate embodiment for the attachment of the outer trunnion 18 to the shroud 27. An outside threaded nut 100 is screwed into the shroud 27 with the seating spacer 48 and flange bushings 50 and 51 positioned between the outside threaded nut 100 and the aperture in the shroud 27. This design would allow for thermal expansion of the trunnion 18 relative to the space. The bushings are held firm enough, but loose enough, not to carry moment loading for long wear life. As above, cooling air path resistance is less for this embodiment than for the outer wall assemblies so that cooling purge air will block out hot mainstream gases.

Figure 8:
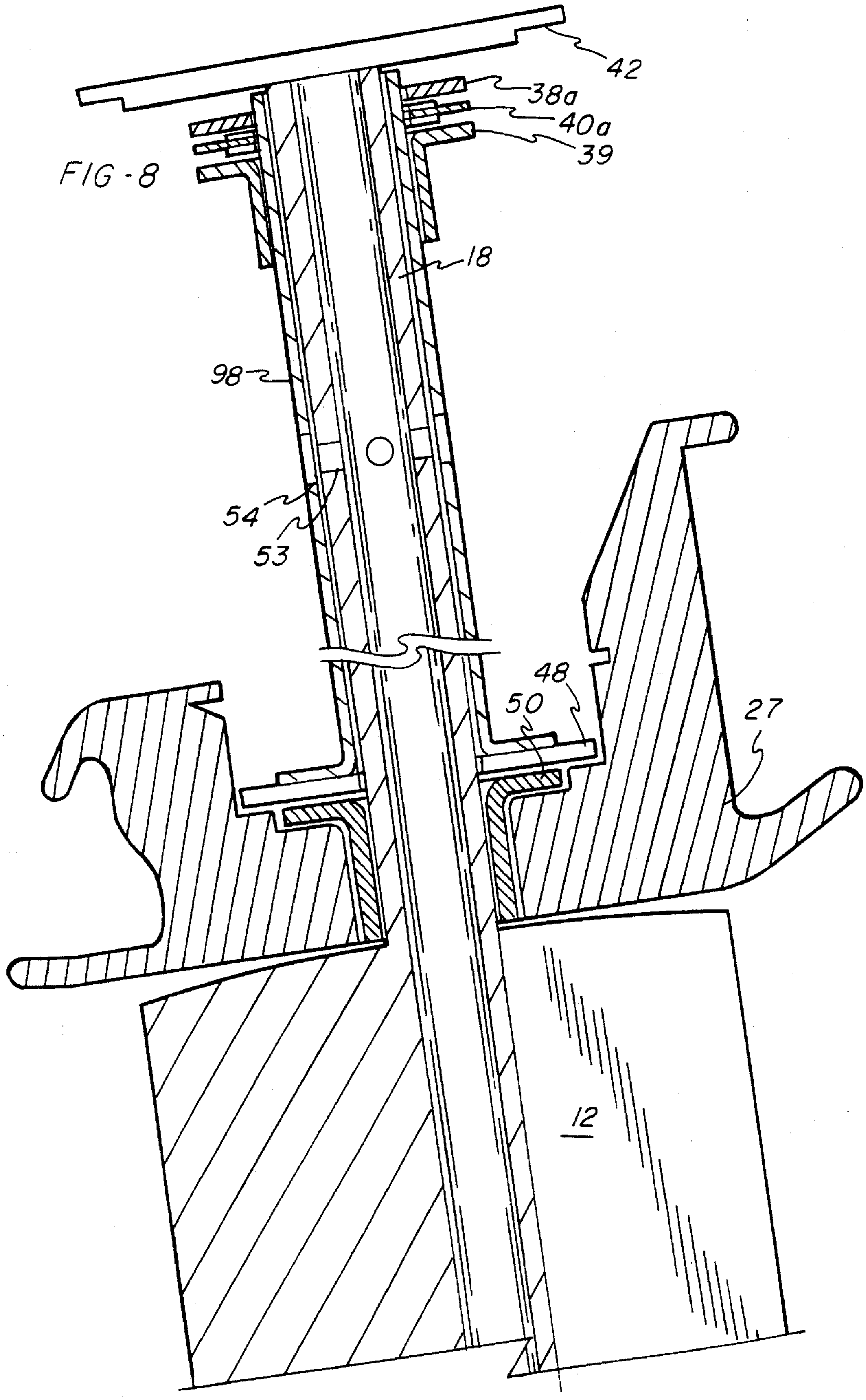
FIG. 8 is an alternative design for the outer bearing assembly.

FIG. 8 is an alternate design wherein the bearing 44 and nut 46 of FIG. 2 are deleted and replaced by a cylindrical shroud spacer 98 or a trunnion shroud with a flat edge at the bottom end. The shroud spacer 98 is perforated by holes 54 to allow the purging air to pass therethrough. In this design, the screws 28*c* and 28*d* (FIG. 2) will seat seating spacers 42 and 48 simultaneously against first adaptor 26*a* and shroud 27. This design would make the assembly easier but requires tighter tolerances.

In the assembly of the present invention the individual vanes 12 are inserted from the inside of the turbine engine by first cutting air foil maximum cross-section holes 77 in the inner diameter ring 60 so that the individual vanes, with trunnion extending from both ends, can be installed. Once the inner segment ring 60 is assembled with insert 86 now covering the air foil maximum cross-section holes 77, an individual vane can be inserted through holes in the outer casing so that the outer trunnion 18 protrudes through the outer casing. Once the outer trunnion 18 is in place and extending to the outside of the outer casing 22, the assembled inner diameter ring 60 and trunnion 20 are assembled with the flange bushing, journal bearings, washers, seating spacers, roller bearings and nut. The nut may be lock-wired or pinned. The cover plate 78 is then installed to form the inner diameter ring as a toroid vessel for holding the cooling and purging air. Once the inner diameter ring 60 is assembled, then the outer casings bearing assemblies are then completed.

Alternatively, the inner diameter ring 60 can be assembled prior to installation inside the turbine engine with the inner diameter ring assembly with each segment 12 and its outer trunnion 18 guided into the outer casing shroud holes. Once again, the outer bearing assemblies would then be completed. Both methods of assembly are repeated for each inner diameter ring segment to form a 360° toroid.

It can be seen from the above description that placement of the bearing assemblies and trunnion 18 cantilevering journal bearings outside of the casing will provide cooler operation of the present invention and provide long life. Further, the outer casing bearing assembly provides easy access for maintenance.

While the form the apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A variable area turbine nozzle for varying the flow through a stage of a turbine engine, said turbine engine having a rotor platform diameter and an outer casing, said rotor platform diameter and outer casing defining a flow path, said variable area turbine nozzle comprising:

an inner diameter toroid ring positioned next to and running 360° to said rotor platform diameter, said inner diameter ring forming a plurality of sealed toroid segments each disposed adjacent to each other in end-to-end relationship;

vane segments each having outer and inner trunnions rotatably disposed in said outer easing and said inner diameter toroid ring of said turbine engine;

bearing assemblies coupled to said outer and inner trunnions and to said outer casing and said inner diameter toroid ring, said bearing assemblies defining purging passages through which air can leak; and means for purging air through said passages to block hot main stream gases for extending the operating life of said bearings.

2. The variable area turbine nozzle of claim 1 positioned between the last stage of a gas generator and the first stage of a low pressure turbine of said turbine engine.

3. The variable area turbine nozzle of claim 1 wherein said vane segments have outer and inner ends with said outer and inner ends having a curvilinear shape, said outer casing and said inner diameter ring having a curvilinear shape opposite said vane ends for non-interfering rotation of said vane segments thereabout for varying the flow path through said stage of said turbine engine.

4. The variable area turbine nozzle of claim 1 wherein said bearing assemblies include journal bearings in cantilevered trunnions defining primary load carriers of moments, said journal bearings being located external to said outer casing.

5. The variable area turbine nozzle of claim 1 wherein said bearing assemblies coupled to said outer trunnions are external to said outer casing for facilitating access to said bearing assemblies for maintenance.

6. The variable area turbine nozzle of claim 1 wherein said bearing assemblies include journal bearings and ball bearings.

7. The variable area turbine nozzle of claim 6 wherein said bearing assemblies rather than bushings carry all axial and moment loads.

8. The variable area turbine nozzle of claim 6 wherein said inner diameter toroid ring is segmented and has a cover plate which when moved circumferentially provides a solid toroid ring of segments and access to said bearing assemblies of said ring.

9. The variable area turbine nozzle of claim 1 wherein said bearing assemblies comprise outer and inner bearing assemblies, said variable area turbine nozzle further comprising an outer cooling chamber surrounding said outer bearing assembly for receiving purging air to cool said outer beating assembly.

10. The variable area turbine nozzle of claim 9 wherein said bearing assemblies comprise air cooled journal and ball bearings comprising a material capable of operation at temperatures above 300 degrees Fahrenheit without degradation.

11. The variable area turbine nozzle of claim 9 wherein said inner diameter ring defines an inner cooling chamber for receiving purging air to cool said inner bearing assembly.

12. The variable area turbine nozzle of claim 11 wherein each of said vane segments defines a cooling passage therethrough for supplying purging air from said outer cooling chamber to said inner cooling chamber.

13. The variable area turbine nozzle of claim 12 wherein said turbine engine has a compressor supplying purging air to said outer cooling chamber and to said inner cooling chamber through said cooling passage.

14. A variable area turbine nozzle for varying the flow through a stage of a multistage turbine engine, said multistage turbine engine having a rotor platform diameter and an outer casing, said rotor platform diameter and said outer casing defining a flow path, said outer casing defining outer apertures, said variable area turbine nozzle comprising:

vane segments each having an outer and inner end and an outer and an inner trunnion, said inner trunnion coupled to said inner end and said outer trunnion coupled to said outer end, one said trunnion disposed through one said outer aperture in said outer casing;

an inner diameter ring adjacent the inner rotor for providing support for said vane segments in an annular configuration, said inner diameter ring defining inner ring mounting apertures for each said inner trunnion of each said vane segment, one said inner trunnion rotatably disposed in a corresponding said inner ring mounting aperture, said inner diameter ring having air foil cross-section cutouts for inserting said vane segments through said cutouts for assembly of said vane segments from inside;

outer and inner bearing assemblies coupled to said outer and inner trunnions and to said outer casing and said inner diameter ring respectively, said bearings defining passages through which air can leak, said bearing assemblies carrying axial and moment loads; and means for purging air through said passages to block hot main stream gases and to cool said inner and outer bearing assemblies.

15. The variable area turbine nozzle of claim 14 further comprising an outer cooling chamber surrounding said outer bearing assembly for receiving said purging air to cool said outer bearing assembly.

16. The variable area turbine nozzle of claim 14 wherein said bearing assemblies comprise material capable of operation at temperatures above 500 degrees Fahrenheit without degradation.

17. The variable area turbine nozzle of claim 14 wherein said bearing assemblies include seating spacers for seating said bearing assemblies for preventing leakage and forcing greater air leakage through said bearing assemblies into said flow path, and smaller air leakage outside said outer casing.

18. The variable area turbine nozzle of claim 14 wherein said outer and inner ends of each of said vane segments have a curvilinear shape, and said outer casing includes a shroud with a curvilinear surface opposite said vane ends and said inner diameter ring having a curvilinear surface opposite said vane ends for non-interfering rotation of said vane segments for varying the flow path between the last stage of a gas generator and the first stage of a low pressure turbine.

19. The variable area turbine nozzle of claim 14 wherein said inner diameter ring defines an inner cooling chamber for receiving said purging air to cool said inner bearing assembly.

20. The variable area turbine nozzle of claim 19 wherein each said vane segment defines a cooling passage therethrough for supplying said purging air to said inner cooling chamber for purging said inner bearing assemblies.

21. The variable area turbine nozzle of claim 20 wherein said multistage engine has a compressor supplying purging air to said outer cooling chamber and to said inner cooling chamber through said cooling passage, said purging air cooling said inner and outer bearing assemblies for prolonging the life of said outer and inner ball bearing assemblies.

22. A method of inserting individual vanes of a midstage variable area turbine nozzle into a multistage turbine engine having an inner rotor diameter segmented ring and an outer casing comprising the steps of:

providing holes in said inner diameter segmented ring and said outer casing;

providing vane segments each having an outer and inner trunnion;

inserting said inner trunnion of a vane segment into said holes in said inner diameter ring;

inserting said outer trunnion of said vane segment through said hole in said outer casing, said outer trunnion extending outside of said outer casing;

assembling a bearing assembly onto each said inner trunnion of each said vane segment for rotatably mounting said inner trunnion to said inner rotor diameter segment;

assembling a bearing assembly onto each said outer trunnion of each said vane segment for rotatably mounting said outer trunnion to said outer casing, said bearing assemblies coupled to said outer trunnions being external to said outer casing for facilitating access thereto for maintenance; and enclosing said inner diameter ring to form a toroid vessel for containing and directing a cooling fluid to cool said bearing assemblies.

23. A method of inserting individual vanes of a midstage variable area turbine nozzle into a multistage turbine engine having an inner diameter and an outer casing, comprising the steps of:

providing a segment of an inner rotor diameter ring;

providing a plurality of cross-section cutouts in said segments of said inner rotor diameter ring;

providing a plurality of vanes each having outer and inner trunnions;

inserting one said vane and its trunnions through one said cutout of said segment of said inner rotor diameter ring;

assembling a bearing assembly onto each said inner trunnion in said segment of said inner rotor diameter ring;

enclosing said segment to form a toroid vessel for directing a cooling fluid to cool said bearing assembly;

providing a hole in said outer casing of said multistage turbine engine;

inserting said segment into said midstage of said multistage turbine engine by guiding said outer trunnions of each said vane into said holes in said outer casing;

assembling a bearing assembly onto each said outer trunnion external to said outer casing for facilitating access thereto for maintenance; and enclosing each said bearing assembly to form a cooling chamber for directing a cooling fluid to cool each said bearing assembly.

24. The method of claim 23 further comprising repeating the steps of assembly and joining each segment of said inner diameter ring to form a nozzle stage of said variable area turbine.

* * * * *